US011302186B2

(12) United States Patent
Shi et al.

(10) Patent No.: US 11,302,186 B2
(45) Date of Patent: Apr. 12, 2022

(54) METHODS AND APPARATUSES FOR CONTROLLING TRAFFIC LIGHTS

(71) Applicant: UISEE TECHNOLOGIES (BEIJING) CO., LTD., Beijing (CN)

(72) Inventors: Lei Shi, Beijing (CN); Yu Zhang, Beijing (CN); Wei Lin, Beijing (CN); Wei Feng, Beijing (CN); Xiaotong Liu, Beijing (CN)

(73) Assignee: UISEE TECHNOLOGIES (BEIJING) CO., LTD., Beijing (CN)

( * ) Notice: Subject to any disclaimer, the term of this patent is extended or adjusted under 35 U.S.C. 154(b) by 0 days.

(21) Appl. No.: 17/419,639

(22) PCT Filed: Dec. 29, 2018

(86) PCT No.: PCT/CN2018/125727
§ 371 (c)(1),
(2) Date: Jun. 29, 2021

(87) PCT Pub. No.: WO2020/133453
PCT Pub. Date: Jul. 2, 2020

(65) Prior Publication Data
US 2022/0084401 A1 Mar. 17, 2022

(51) Int. Cl.
*G08G 1/087* (2006.01)
*G06K 9/00* (2022.01)

(52) U.S. Cl.
CPC ......... *G08G 1/087* (2013.01); *G06K 9/00825* (2013.01); *G06K 2209/23* (2013.01)

(58) Field of Classification Search
None
See application file for complete search history.

(56) References Cited

U.S. PATENT DOCUMENTS

| 4,914,434 | A | | 4/1990 | Morgan et al. | |
|---|---|---|---|---|---|
| 5,172,113 | A | * | 12/1992 | Hamer | G08G 1/087 340/902 |

(Continued)

FOREIGN PATENT DOCUMENTS

| CN | 101123038 A | 2/2008 |
|---|---|---|
| CN | 101218614 A | 7/2008 |

(Continued)

OTHER PUBLICATIONS

The State Intellectual Property Office of People's Republic of China, the Second Office Action for Chinese Patent Application No. 201910007978.3, Nov. 24, 2020, 18 pages.

(Continued)

*Primary Examiner* — John F Mortell
(74) *Attorney, Agent, or Firm* — Enshan Hong; MagStone Law, LLP

(57) ABSTRACT

A method for controlling traffic lights and a traffic light system using such method are provided. The method comprises: a receiving apparatus acquires a vehicle classification of a target vehicle (410), and then determines whether to turn green for a vehicle arriving at a traffic light, according to the vehicle classification (420). Due to a low network delay and high data transmission rate requirement, although applicable in a 4G network environment, the disclosed technology is more suitable for a 5G network environment.

18 Claims, 3 Drawing Sheets

(56) References Cited

U.S. PATENT DOCUMENTS

| | | | | |
|---|---|---|---|---|
| 6,985,827 | B2* | 1/2006 | Williams | G01P 3/38 |
| | | | | 700/159 |
| 8,344,908 | B2* | 1/2013 | Johnson | G08G 1/087 |
| | | | | 340/906 |
| 9,761,131 | B2* | 9/2017 | Robinson | G06K 9/00785 |
| 2003/0154017 | A1* | 8/2003 | Ellis | G01S 13/88 |
| | | | | 701/117 |
| 2019/0057260 | A1* | 2/2019 | Huang | G06K 9/6267 |
| 2020/0005631 | A1* | 1/2020 | Visintainer | G06K 9/2018 |
| 2020/0110416 | A1* | 4/2020 | Hong | G06K 9/00825 |

FOREIGN PATENT DOCUMENTS

| | | |
|---|---|---|
| CN | 101540109 A | 9/2009 |
| CN | 101587648 A | 11/2009 |
| CN | 101901549 A | 12/2010 |
| CN | 102094370 A | 6/2011 |
| CN | 102542819 A | 7/2012 |
| CN | 102737514 A | 10/2012 |
| CN | 103065479 A | 4/2013 |
| CN | 203433679 U | 2/2014 |
| CN | 104064042 A | 9/2014 |
| CN | 105551276 A | 5/2016 |
| CN | 105590481 A | 5/2016 |
| CN | 108022436 A | 5/2018 |
| CN | 108922167 A | 11/2018 |
| CN | 109003461 A | 12/2018 |
| JP | 2002042291 A | 2/2002 |
| JP | 2010061335 A | 3/2010 |
| JP | 2014222475 A | 11/2014 |

OTHER PUBLICATIONS

Yuan Zhong, Signal Priority Coordination Control of Multi-Intersections for Emergency Vehicles, China Master's Theses Full-text Database, U491.232, p. 16, May 15, 2012.

* cited by examiner

METHODS AND APPARATUSES FOR CONTROLLING TRAFFIC LIGHTS

CROSS-REFERENCE TO RELATED APPLICATIONS

This application is a national phase application of International Application No. PCT/CN2018/125727, filed on Dec. 29, 2018, which is hereby incorporated by reference in its entirety.

TECHNICAL FIELD

The present disclosure relates to the field of intelligent driving, and particularly to the field of V2X for intelligent driving.

BACKGROUND

Automobiles have become important traveling tools for human societies. While automobiles are bringing convenience to daily life, traffic jams caused by automobiles may also be inconvenient to people.

Thus, traffic control is particularly important, e.g., by installing traffic lights on roads. When a traffic light turns red, a vehicle should stop. However, in some cases, the red light is unnecessary, e.g., when there is no other vehicle near the road. Therefore, a method for intelligently controlling traffic lights is critical and highly practical.

SUMMARY OF THE INVENTION

An objective of the present disclosure is to provide a method for intelligently controlling traffic lights, which can intelligently control the traffic lights according to specific conditions at specific timings, thereby controlling traffic flows more reasonably and enhance the efficiency with which people travel.

An aspect of the present disclosure provides an apparatus for controlling traffic lights, including: at least one storage device including a set of instructions; and at least one processor in communication with the at least one storage device, wherein when the set of instructions is executed, the at least one processor: acquires a vehicle classification of a target vehicle on a first road, wherein the vehicle classification is determined based on a type of the target vehicle and a travel purpose; and performs a target operation according to the vehicle classification of the target vehicle.

Another aspect of the present disclosure provides a method for controlling traffic lights, including acquiring, by a receiving apparatus, a vehicle classification of a target vehicle on a first road, wherein the vehicle classification is determined based on a type of the target vehicle and a travel purpose; and performing a target operation according to the vehicle classification of the target vehicle.

A further aspect of the present disclosure provides a non-volatile computer readable medium including a computer program product. The computer program product includes instructions that enable a computing device to: acquire a vehicle classification of a target vehicle on a first road, wherein the vehicle classification is determined based on a type of the target vehicle and a travel purpose; and perform a target operation according to the vehicle classification of the target vehicle.

Additional features of the present disclosure will be set forth in part in the following description, so that the contents illustrated in the following drawings and embodiments become obvious to those skilled in the art. The inventive features in the present disclosure can be fully explained by practicing or using the methods, means, and combinations thereof set forth in the detailed examples discussed below.

BRIEF DESCRIPTION OF THE ACCOMPANYING DRAWINGS

The following accompanying figures illustrate, in detail, the exemplary embodiments disclosed in the present disclosure, wherein like reference numerals refer to similar structures throughout the views of the accompanying figures. Those skilled in the art will understand that these embodiments are non-restrictive and exemplary. The accompanying drawings are only for the purpose of illustration and description and are not intended to restrict the scope of the present disclosure. Other embodiments may also fulfill inventive intentions in the present disclosure. It should be understood that the accompanying figures are not drawn to scale. In which, FIG. 1 illustrates an application scenario diagram that provides illustration of controlling traffic lights, according to some embodiments of the present disclosure;

DETAILED DESCRIPTION OF THE PREFERRED EMBODIMENTS

Figure 1:
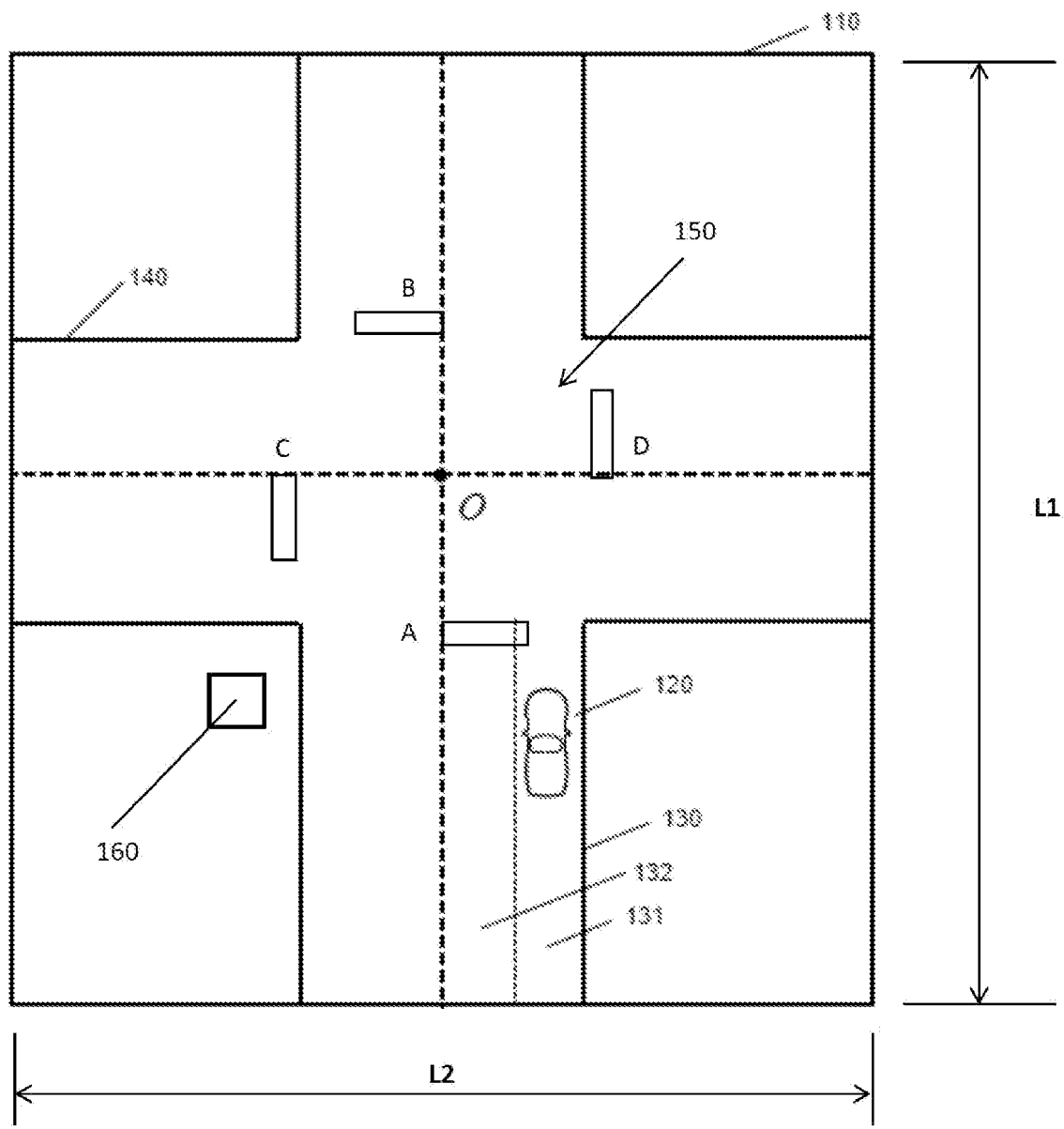

An aspect of the present disclosure provides an apparatus for controlling traffic lights. The apparatus may communicate with a vehicle (e.g., an autonomous vehicle) that is passing a traffic light, acquire its vehicle classification, and then determine whether to change traffic signals from red to green for the vehicle, according to its vehicle classification. For example, when the vehicle is an on-duty fire truck, its vehicle classification overrides any surrounding traffic condition, and the apparatus may change traffic signals from red to green for the fire truck automatically.

In the present disclosure, the communication between the apparatus and the vehicle may be implemented in a 4G or lower generation network environment. However, since the invention in the present disclosure may cause a low network delay and may require a high data transmission rate, it is more suitable for a 5G network environment. In the 4G network environment, the data rate is on a scale of 100 Mbps. The latency is 30 to 50 milliseconds ("ms"). The maximum number of connections per square kilometer is on a scale of 10,00. The mobile top speed is about 350 km/h. While in the 5G network environment, a data rate is on a scale of 10 Gbps. The latency is 1 ms. The maximum number of connections per square kilometer is on a scale of one million. The mobile top speed is about 500 km/h. The 5G network environment has a higher data rate, a lower latency, more connections per square kilometer and a higher mobile speed tolerance. Another advantage of the 5G network environment is a change of a transmission path. A transmission can be carried out directly between two devices. As such, a base station is no longer required.

Therefore, although the present disclosure may be implemented in a 4G network environment, its operation can achieve better technical performance and reflect a higher commercial value in a 5G network environment.

The following description provides typical application scenarios and requirements of the present disclosure, wherein those skilled in the art can make and use the contents of the present disclosure. Various partial modifications applied to the disclosed embodiments should be obvious to those skilled in the art. The general principles defined here may be applicable to other embodiments and applications without deviating from the scope of the present disclosure. Therefore, the present disclosure is not limited to the illustrated embodiments but includes the broadest scope of the claims.

The terms used here are to describe the particular exemplary embodiments only, rather than being restrictive. For example, as used here, the singular forms "a/an," "one" and "the" may also include the plural forms unless the context clearly indicates otherwise. As used in this specification, the terms "comprise", "include" and/or "contain" mean the presence of associated integers, steps, operations, elements and/or components, but do not exclude the presence of one or more other features, integers, steps, operations, elements, components and/or groups, or other features, integers, steps, operations, elements, components and/or groups may be added to the system/method.

In the present disclosure, the term "autonomous vehicle" may refer to a vehicle that can detect an environment thereof and automatically detect, determine, then make decisions based on an external environment without any input and/or intervention from any person (e.g., a driver, a pilot, etc.). The terms "autonomous vehicle" and "vehicle" may be used interchangeably. The term "automatic driving" may refer to a capability to intelligently determining a surrounding environment and making a navigation decision without any input from any person (e.g., a driver, a pilot, etc.).

Considering the following description, several aspects can be significantly improved: the features of the present disclosure, the operations and functions of structure-related elements, as well as the economy of combination and manufacture of components. With reference to the accompanying drawings, all of the above items are parts of the present disclosure. However, it should be clearly understood that the accompanying drawings are for illustration and description only and not to restrict the scope of the present disclosure.

The flowcharts used in the present disclosure illustrate operations that are systematically implementations based upon some embodiments of the present disclosure. It should be clearly understood that flowchart operations may be implemented out of an illustrated order. On the contrary, the operations may be implemented in reverse order or simultaneously. In addition, one or more other operations may be added to the flowchart. One or more operations may be removed from the flowchart.

The positioning technology used in the present disclosure may be based on one or combinations of a Global Positioning System (GPS), a Global Navigation Satellite System (GLONASS), a Compass navigation system (COMPASS), a Galileo positioning system, a Quasi-Zenith Satellite System (QZSS), a Wireless Fidelity (Wi-Fi) positioning technology, etc. One or more of the above-listed positioning systems may be used interchangeably in the present disclosure.

An aspect of the present disclosure relates to a method for controlling traffic lights and an apparatus using the method. Specifically, the method may include: acquiring, by a receiving apparatus, a vehicle classification of a target vehicle and determining whether to turn green for the target vehicle arriving at the traffic light based on the vehicle level. The system automatically performs the method, which, on the one hand, improves the transportation efficiency of traffic flows at an intersection, and on the other hand, considers the traffic smoothness of the intersection through which special vehicles pass.

FIG. 1 is a diagram illustrating an application scenario of traffic lights controlling according to some embodiments of the present disclosure.

As shown in FIG. 1, a road 130 runs in a north-south direction. A road 140 runs in an east-west direction. Each road may include multiple lanes. For example, road 130 in the north-south direction may include a straight lane 131 and a left turning lane 132. Road 130 intersects with road 140 at an intersection 150. There are four traffic lights A, B, C, and D at intersection 150. Light A controls a traffic flow from south to north on road 130. Light B controls a traffic flow from north to south on road 130. Light C controls a traffic flow from west to east on road 140. Light D controls a traffic flow from east to west on road 140. A center of the intersection is a point marked as O. The location of point O is related to the location of traffic lights at the intersection. For example, the center of all traffic lights at the intersection may be point O. A vehicle 120 travels on road 130 and intersection 150 is ahead. Vehicle 120 may be any automobile lawfully traveling on road 130. For example, vehicle 120 may be a motor vehicle or a non-motor vehicle. For example, vehicle 120 may include any kind of vehicles such as a fire truck, ambulance, police car, private car, bus, taxi, truck, motorcycle, scooter, bicycle, and balance car.

When vehicle 120 arrives at intersection 150, the traffic thereof is controlled by a corresponding traffic light A at intersection 150. When the corresponding traffic light A turns red, vehicle 120 must stop. When the corresponding traffic light A turns green, vehicle 120 can proceed.

For the sake of describing the present disclosure, traffic lights at the intersection are taken as examples throughout the following description of the present disclosure. It should be understood that the technical solutions disclosed in the present disclosure apply to traffic lights at an intersection and those at various road junctions such as a junction of three roads, a T-junction, a junction of five roads, and a roundabout. As the type of the road junction changes, the technical solutions disclosed in the present disclosure may adaptively change without requiring undue experimentation by those skilled in the art.

A target area 110 may be determined based on the location of traffic lights at the intersection. The target area facilitates the performance of the method for controlling the traffic lights as disclosed in the present disclosure, which will be described in detail below.

When traveling on road 130 in the north-south direction, vehicle 120 is controlled by traffic light A for the north-south direction. Specifically, when traveling on straight lane 131 on road 130 in the north-south direction, vehicle 120 is controlled by a straight or left turning light of traffic light A for the north-south direction.

Figure 3:
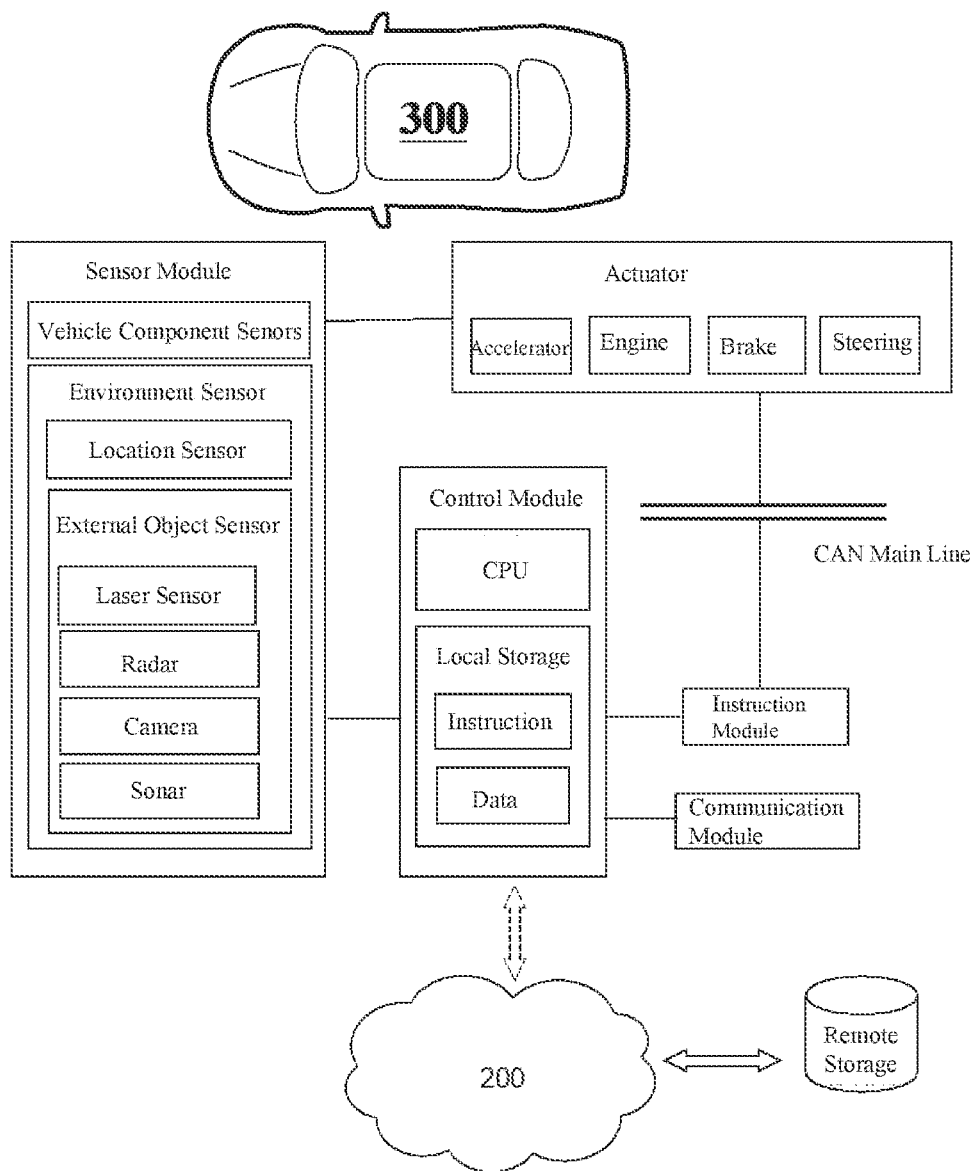
FIG. 3 illustrates a block diagram of an exemplary vehicle which having an autonomous driving capability, according to some embodiments of the present disclosure.

Vehicle 120 (e.g., autonomous vehicle) or a device carried thereon (e.g., an auto-driving control apparatus or a mobile phone client) may interact with a receiving apparatus 160. Receiving apparatus 160 may control traffic lights A, B, C, and D. Apparatus 160 may interact with the traffic light control apparatus, and may then indirectly control the traffic lights A, B, C, and D by sending instructions to the traffic light control apparatus, thereby influencing the control of vehicle 120 by traffic lights at the intersection. For example, vehicle 120 may send a request to apparatus 160 to change traffic light colors. When the request is accepted, the control of vehicle 120 by the traffic light is changed. Specifically, the method and apparatus for controlling the traffic lights are illustrated in FIG. 3.

Apparatus 160 may be installed on any one of the traffic lights A, B, C, and D. Apparatus 160 may also be independently installed at an intersection or any other locations, provided that the apparatus can interact with vehicle 120 and the traffic lights. The interaction may be achieved via a near field communication, a wireless network, and a mobile network (e.g., a 3G, 4G, or 5G network).

Figure 2:
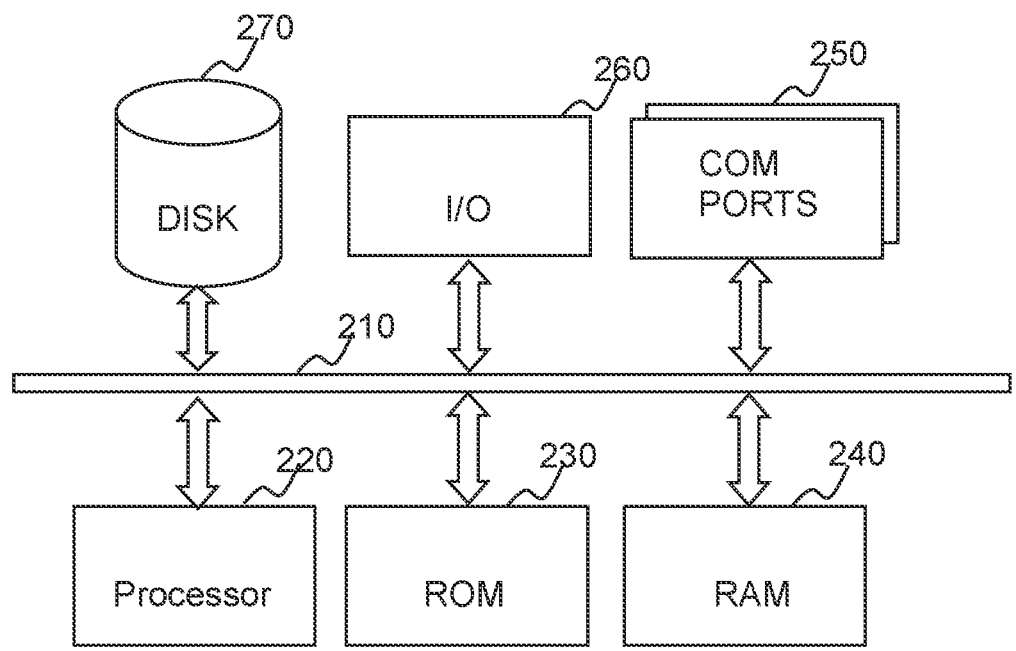
FIG. 2 illustrates an exemplary data processing device on which a method for controlling traffic lights may be implemented, according to some embodiments of the present disclosure.

FIG. 2 illustrates an example data processing device based on some embodiments of the present disclosure. The data processing device may be used to implement a method for controlling traffic lights.

A data processing device 200 may serve as receiving apparatus 160 to perform the method for controlling traffic lights disclosed in the present disclosure. For example, data processing device 200 may perform process 400.

Data processing device 200 may include a COM port 250 connected to a network connected to data processing device 200 to facilitate data communication. Data processing device 200 may further include a processor 220, which may comprise one or more processors, to execute computer instructions. Computer instructions that perform particular functions described herein may include, for example, routines, programs, objects, components, data structures, processes, modules, and functional blocks. For example, processor 220 may receive a request from vehicle 120 to change traffic signals from red to green. As another example, processor 220 may determine the vehicle classification of vehicle 120 based on the type of vehicle 120 and its travel purpose and may then determine whether to accept the request sent by vehicle 120 based on its vehicle classification.

In some embodiments, processor 220 may include one or more hardware processors, such as a microcontroller, a microprocessor, a Reduced Instruction Set Computer (RISC), an Application Specific Integrated Circuit (ASIC), an Application Specific Instruction-Set Processor (ASIP), a Central Processing Unit (CPU), a Graphics Processing Unit (GPU), a Physical Processing Unit (PPU), a microcontroller unit, a Digital Signal Processor (DSP), a Field Programmable Gate Array (FPGA), an Advanced RISC Machine (ARM), a Programmable Logic Device (PLD), any circuit or processor capable of performing one or more functions, etc., or combinations thereof.

The example data processing device 200 may include an internal communication bus 210, program storage and different forms of data storage (e.g., a magnetic disk 270, a Read Only Memory (ROM) 230, or a Random-Access Memory (RAM) 240) for various data files processed and/or transmitted by a computer. Data processing device 200 may further include program instructions stored in ROM 230, RAM 240, and/or other types of non-transitory storage to be executed by processor 220. The method and/or process of the present disclosure may be implemented as program instructions. Data processing device 200 may further include an I/O component 260 that supports inputs/outputs between the computer and other components (e.g., a user interface element). Data processing device 200 may further receive programs and data through network communication.

Just for illustration, there is only one processor described in data processing device 200 in the present disclosure. However, it should be noted that data processing device 200 in the present disclosure may also include a plurality of processors. Thus, the operations and/or methodical steps disclosed in the present disclosure can be executed by one processor as described in the present disclosure or jointly executed by multiple processors. For example, if processor 220 of data processing device 200 in the present disclosure executes steps A and B, it should be understood that two different processors may jointly or separately execute A and B in the information processing device (e.g., the first processor executes step A and the second processor executes step B, or the first and second processors jointly execute A and B).

FIG. 3 is a block diagram of an exemplary vehicle having an autonomous driving capability based on some embodiments of the present disclosure. Vehicle 120 illustrated in FIG. 1 may be vehicle 300 or any other vehicle with or without an automatic driving capability. For example, vehicle 300 with an automated driving capability may include a control module, a plurality of sensors, a communication module, a memory, an instruction module, a Controller Area Network (CAN), and an actuator.

The actuator may perform functions that include, but are not limited to, driving an accelerator, an engine, a braking system and a steering system (including steering of tires and/or an operation on turning lights).

The plurality of sensors may include various internal sensors and external sensors that provide data to vehicle 300. For example, as illustrated in FIG. 3, the plurality of sensors may include a vehicle component sensor and an environmental sensor. The vehicle component sensor may be connected to the actuator of vehicle 300 and can detect a running status and parameters of each component of the actuator.

The environment sensor may enable the vehicle to understand and potentially respond to its environment, to help autonomous vehicle 300 in navigation, route planning, and guarantee of safety of passengers, persons, and properties in the surrounding environment. The environmental sensor may also be used to identify, track, and predict movements of objects such as pedestrians and other vehicles. The environmental sensor may include a location sensor and an external object sensor.

The location sensor may include a GPS receiver, an accelerometer and/or a gyroscope, and a receiver. The location sensor may sense and/or determine a geographic location and orientation of autonomous vehicle 300, such as latitude, a longitude, and a height of the vehicle.

The external object sensor may detect objects outside the vehicle, such as other vehicles, obstacles in the road, traffic signals, signs, trees, etc. The external object sensors may include a laser sensor, a radar, a camera, a sonar and/or any other detection devices.

The communication module may be constructed as a module for interactive communication between the autonomous vehicle and the external environment. For example, the communication module may assist the control module in communicating wirelessly with external objects. In some embodiments, the communication module may include an antenna and a power amplifier circuit.

After receiving information sensed by multiple sensors, the control module may process information and/or data related to vehicle driving (e.g., automatic driving). In some embodiments, the control module may be configured to drive the vehicle autonomously. For example, the control module may output a plurality of control signals which may be configured to be received by one or more Electronic Control Units (ECUs) to control the vehicle movement. In some embodiments, the control module may determine a reference route and one or more candidate routes based on environmental information of the vehicle.

In some embodiments, the control module may include one or more central processing units (e.g., a single-core processor or a multi-core processor). By way of example only, the control module may include a central processing unit (CPU), an Application-Specific Integrated Circuit (ASIC), an Application-Specific Instruction-Set Processor (ASIP), a Graphics Processing Unit (GPU), a Physics Processing Unit (PPU), a Digital Signal Processor (DSP), a Field Programmable Gate Array (FPGA), a Programmable Logic Device (PLD), a controller, a microcontroller unit, a Reduced Instruction-Set Computer (RISC), a microprocessor, etc., or combinations thereof.

The control module may also wirelessly communicate with external objects through the communication module. For example, the control module may interact with receiving apparatus 160 to notify the vehicle classification of an autonomous vehicle and/or send a limited request for traffic lights.

The instruction module receives information from the control module, converts the received information into instructions for driving the actuator and sends the instructions to a Controller Area Network (CAN) bus. For example, the control module sends a control strategy (acceleration, deceleration, turning, etc.) of autonomous vehicle 200 to the instruction module. The instruction module receives the control strategy and converts it into driving instructions for the actuator (driving instructions for the accelerator, brake mechanism, or steering mechanism). At the same time, the instruction module sends the instructions to the actuator through the CAN bus. The actuator's execution consequence is detected by the vehicle component sensor and fed back to the control module, thereby completing a closed-loop control of autonomous vehicle 300.

Figure 4:
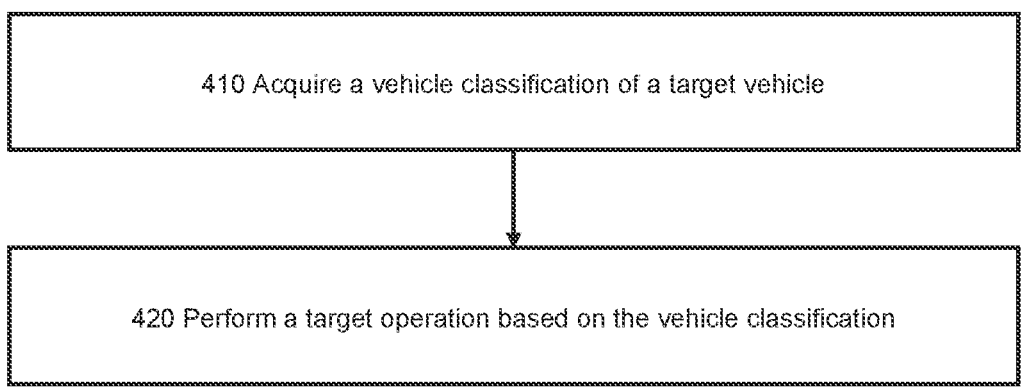
FIG. 4 illustrates a flowchart of a method for controlling traffic lights, according to some embodiments of the present disclosure.

FIG. 4 is a flowchart illustrating a method for controlling traffic lights according to some embodiments of the present disclosure. A process 400 may be implemented as a set of instructions in a non-transitory storage medium in a data processing device 200 (e.g., a receiving apparatus 160). Data processing device 200 (receiving apparatus 160) may execute the set of instructions and correspondingly execute steps in the flow 400 to control the traffic lights.

Operations of the illustrated process 400 presented below are intended to be illustrative rather than restrictive. In some embodiments, when process 400 is implemented, one or more additional operations not described may be added, and/or one or more operations described herein may be deleted. In addition, the order of operations illustrated in FIG. 4 and description below is not restrictive.

At step 410, data processing device 200 (receiving apparatus 160) may acquire a vehicle classification of a target vehicle 120 on a first road.

The first road may be a road in a certain direction, e.g., a road 130 in a north-south direction, a road 140 in an east-west direction, or a particular lane on a road in a certain direction (e.g., a straight lane 131 or a left turning lane 132).

The vehicle classification is determined by the type and travel purpose of the target vehicle 120. The types of the vehicle may include a fire truck, ambulance, police car, private car, bus, taxi, truck, etc. The travel purpose may include emergency rescue and disaster relief, patient transportation, alarm response (chasing fugitives), travel, commute, public transportation, and cargo transportation. Generally, fire trucks for emergency rescue and disaster relief, ambulances for patient transportation, and police cars for chasing fugitives have higher vehicle classifications, while transports without any urgent transportation purpose have lower vehicle classifications, such as private cars to and from work, and trucks for ordinary goods. It should be understood that the determinations of the type of the vehicle, the travel purpose, and the vehicle classification described above are exemplary only, and the determination of the vehicle classification will change according to particular situations. For example, for the bus, the passengers have different travel purposes. In addition, the vehicle classification may be determined based on factors besides the type of the vehicle and the travel purpose, such as time. For example, a private car commuting at 5 pm and a private car commuting at 2 am may have different vehicle classifications.

The target vehicle 120 may actively send its own vehicle classification directly to data processing device 200 (receiving apparatus 160). The target vehicle 120 may send its vehicle classification to data processing device 200 (receiving apparatus 160) once or multiple times. Accordingly, data processing device 200 may receive the vehicle classification sent by the target vehicle 120 once or multiple times. For example, the target vehicle 120 sends its vehicle classification to data processing device 200 (receiving apparatus 160) only once when data processing device 200 (receiving apparatus 160) is guaranteed to receive successfully. Under some circumstances, the target vehicle 120 may send its vehicle classification to data processing device 200 (receiving apparatus 160) multiple times. For example, when data processing device 200 (receiving apparatus 160) does not successfully receive the vehicle classification of the target vehicle 120, or when the vehicle classification of the target vehicle 120 changes, the target vehicle 120 may send its vehicle classification to data processing device 200 (receiving apparatus 160) again.

Alternatively, data processing device 200 (receiving apparatus 160) may acquire the vehicle classification of the target vehicle 120 in the following ways:

(1) The data processing device 200 (receiving apparatus 160) may first receive a request sent by the target vehicle 120 to make the traffic light turn green.

The request sent by the vehicle may be a request sent by the vehicle itself (e.g., the autonomous transport 120), or a request sent by a device carried by the vehicle (e.g., a control module of the autonomous vehicle 120, or a mobile phone client of a passenger on the autonomous vehicle 120).

Vehicle 120 may send a request to data processing device 200 (receiving apparatus 160) one or more times. Accordingly, data processing device 200 (receiving apparatus 160) may receive the request sent by the vehicle one or more times. Generally, data processing device 200 only receives the request sent by the vehicle once. Under some special circumstances, the data processing device 200 may receive the request sent by the vehicle multiple times. For example, when the vehicle classification of the vehicle changes, the data processing device 200 may receive the request sent by the target vehicle again.

The data processing device 200 may receive a request sent by a target vehicle in a target area. FIG. 1 illustrates an area L1 and/or L2 within a predetermined priority to the traffic lights at an intersection, such as an area within 20 meters from the traffic lights at the intersection. Since the traffic lights at the intersection are close to the center (point O) of the intersection, the target area may also be an area within a predetermined priority to point O.

(2) data processing device 200 (receiving apparatus 160) may determine the vehicle classification of the target vehicle 120.

Data processing device 200 (receiving apparatus 160) may determine a plurality of dimensions, including the type of the vehicle and the travel purpose, and then establish a model including the described dimensions and determine the vehicle classification of the vehicle accordingly.

As an example, a data processing model may set the maximum vehicle classification, such as level 11, to fire trucks for emergency rescue and disaster relief and ambulances for patient transportation. Then the model may assign a high vehicle classification, such as level 10, to police cars chasing fugitives and may assign a low vehicle classification, such as level 4, to private cars commuting at a normal time.

At step 420, data processing device 200 (receiving apparatus 160) may perform a target operation based on the vehicle classification of the target vehicle.

In some embodiments, the target operation At step 420 may include: data processing device 200 (receiving apparatus 160) determines whether the vehicle classification of the target vehicle is lower than a first threshold; and instructs a corresponding traffic light to turn green when the vehicle classification of the target vehicle 120 is not lower than the first threshold. The first threshold may be a preset vehicle classification for traffic lights.

Indicating a corresponding traffic light to turn green includes setting a corresponding traffic light in the traveling direction of the target vehicle to turn green and may simultaneously include setting conflicting traffic lights to turn red. For example, traffic light A corresponding to the lane of the target vehicle 120 in FIG. 1 may be set to turn green. The conflicting traffic lights may include those which will hinder the target vehicle 120 from passing through intersection 150, such as traffic lights B, C, and D in FIG. 1. If those traffic lights are not set to turn red (or yellow lights first and then red lights), when a vehicle traveling on a corresponding road passes through intersection 150, it may hinder the target vehicle 120 from smoothly passing through intersection 150. A turned-on duration may be a length of time for vehicle 120 to pass by the traffic lights (or pass through the intersection) or a predetermined length of time.

The first threshold is lower than the maximum vehicle classification and higher than the minimum vehicle classification. As an example, the first threshold may be level 9. In conjunction with the above example, fire trucks for emergency rescue and disaster relief (the vehicle classification is 11), ambulances for patient transportation (the vehicle classification is 11), and police cars chasing fugitives (the vehicle classification is 10) should each have a vehicle classification not lower than (either higher than or equal to) the first threshold, and data processing device 200 may instruct the corresponding traffic light to turn green.

In some embodiments, the target operation At step 420 may further include: when the vehicle classification of the target vehicle 120 is not lower than the first threshold, determining whether the vehicle classification of the target vehicle is higher than the maximum value among vehicle classifications of all vehicles on the second road (e.g., road 140 in FIG. 1) in the target area. When the vehicle classification of the target vehicle is higher than the maximum value among vehicle classifications of all vehicles on the second road in the target area, data processing device 200 (receiving apparatus 160) instructs the corresponding traffic light to turn green. When the vehicle classification of the target vehicle is lower than the maximum value among vehicle classifications of all vehicles on the second road in the target area, data processing device 200 (receiving apparatus 160) does not set any traffic light for the target vehicle.

For example, when a police car 120 chases a fugitive on road 130, its vehicle classification is 10, which is higher than the first threshold (i.e., level 9) on road 130. When the police car 120 straightly passes through the intersection 150, there is no vehicle with a vehicle classification equal to or higher than level 9 on road 140, if all vehicles on road 140 are running normally. Then data processing device 200 (receiving apparatus 160) instructs the corresponding traffic light A to turn green, while closing other roads by the remaining traffic lights B, C and D, so that police car 120 can pass through intersection 150 smoothly. However, if there happens to be a fire truck with a vehicle classification of 11 traveling on road 140 towards intersection 150 when police car 120 straightly passes through intersection 150, data processing device 200 (receiving apparatus 160) will preferentially give a road priority to the fire truck having a higher vehicle classification, rather than giving a road priority to police car 120 and changing the setting of the traffic light. Thus, data processing device 200 (receiving apparatus 160) may instruct the corresponding traffic light A to turn red.

A corresponding traffic light referenced by the target vehicle 120 during traveling in the target area is different from a traffic light referenced by a vehicle during traveling on the second road. That is, the target vehicle and the vehicle on the second road cannot travel at the same time.

The first road and the second road may be different roads or different lanes of the same road. For example, the first road is a road 130 in a north-south direction, and the second road is a road 140 in an east-west direction. As another example, the first road is a straight lane 131 and the second road is a left turning lane 132.

In some embodiments, the target operation at step 420 may further include: determining, by data processing device 200, whether the vehicle classification of the target vehicle is lower than the first threshold; when the vehicle classification of the target vehicle is lower than the first threshold, determining whether the vehicle classification of the target vehicle is higher than the road level of the second road; when the vehicle classification of the target vehicle is higher than the road level of the second road, instructing, by data processing device 200 (receiving apparatus 160), the corresponding traffic light to turn green; when the vehicle classification of the target vehicle is not higher than the road level of the second road, instructing, by data processing device 200 (receiving apparatus 160), the traffic light to work according to an predetermined setting.

In some embodiments, a road level of a road (e.g., the second road) may be determined based on the number and vehicle classifications of all vehicles on the road (e.g., the second road) in the target area. As the number of all vehicles on the road (e.g., the second road) in the target area increases, the road level may increase. For example, a road level of a road during rush hours may be higher than a road level of the same road during other times. The road level rises as vehicle classifications of all vehicles on a road (e.g., the second road) in the target area rose. For example, when there are fire trucks and ambulances on duty on the road, the road level of the corresponding road section will rise as a result. Because the above-described vehicles have a vehicle classification of 11, the road level of the corresponding road section will rise to 11 when such vehicles pass by. data processing device 200 may determine a plurality of dimensions corresponding to the number of the vehicles and vehicle classifications of the vehicles. Data processing device 200 may then construct a model including the plurality of dimensions and may determine the road level of the road based on the model.

For example, the target vehicle 120 illustrated in FIG. 1 is a private car commuting back home from work, with a vehicle classification of 4, which is lower than the first threshold (level 9). The target vehicle 120 arrives at a target area L1 around 10 pm. Since there are very few and almost no vehicles in the target area L2 at 10 pm, data processing device 200 may lower the road level of road 140 to a level not higher than level 4, such as level 2. When the target vehicle 120 approaches intersection 150, data processing device 200 (receiving apparatus 160) may cause traffic light A to turn green and cause the traffic lights at other intersections to turn red, since the vehicle classification of the target vehicle 120 is higher than the road level of the second road 140. However, if the target vehicle 120 backs home from work at 6 pm, which is the rush hour. And there are so many traffic flows in the target area L2 that the road level at that time is 5, which is higher than the vehicle classification (level 4) of the target vehicle 120. Data processing device 200 (receiving apparatus 160) may instruct the current traffic light to work according to the predetermined setting, i.e., controlling a corresponding traffic light as planned.

In some embodiments, the target operation At step 420 may further include: when the vehicle classification of the target vehicle is lower than the first threshold, determining whether the vehicle classification of the target vehicle is higher than the maximum value of the vehicle classifications of all vehicles on the second road in the target area; and when the vehicle classification of the target vehicle is higher than the maximum value of the vehicle classifications of all vehicles on the second road in the target area, determining whether the vehicle classification of the target vehicle is higher than the road level of the second road.

Since the computational load of determining the road level of the second road is larger than that of determining the maximum value among vehicle classifications of all vehicles on the second road, data processing device 200 may determine whether the vehicle classification of the target vehicle is higher than the maximum value of the vehicle classifications of all vehicles on the second road in the target area, before determining whether the vehicle classification of the target vehicle is higher than the road level of the second road. When the vehicle classification of the target vehicle is not higher than the maximum value among vehicle classifications of all vehicles on the second road in the target area, the data processing device 200 may determine that the vehicle classification of the target vehicle may not be higher than the road level of the second road.

In some embodiments, the target operation at step 420 may further include guiding, by data processing device 200, the speed of the target vehicle. For example, in the scenario illustrated in FIG. 1, before or while instructing the corresponding traffic light A to switch a traffic light signal, data processing device 200 (receiving apparatus 160) may guide the speed of the target vehicle 120 in a predetermined strategy based on a distance between the target vehicle 120 and intersection 150 and the speed of the target vehicle 120. For example, for an on-duty fire truck, the predetermined strategy is to let the fire truck arrive at the fire scene as soon as possible. However, it takes some time to clear the traffic at the intersection by utilizing traffic lights A, B, C, and D. Thus, the time for the fire truck to arrive at intersection 150 must be slightly longer than the "clearing" time. Therefore, the maximum speed and acceleration of the fire truck are limited. Accordingly, while acquiring the vehicle classification of the fire truck and determining that the corresponding traffic light A should be instructed to turn green, data processing device 200 (receiving apparatus 160) may also instruct the fire truck to accelerates to the maximum speed allowed on the traffic conditions of road 130 and intersection 150. Another example, a private car backs from work at 10 pm, data processing device 200 (receiving apparatus 160) determines that the corresponding traffic light A may be instructed to turn green. Since the private car is not in an emergency circumstance, the predetermined strategy may be to notify the private car to pass through the intersection at a constant speed. Accordingly, data processing device 200 (receiving apparatus 160) will notify the private car to travel at a constant speed, and only instructs traffic light A to turn green when the private car is at a preset distance from the intersection. Another example, if determining that the existing switching cycle of traffic lights will not be changed for the private car, data processing device 200 (receiving apparatus 160) will estimate a timing when the private car arrives at the intersection, and correspondingly indicate whether the private car should travel at a constant speed, accelerate, or decelerate based on the traffic light signal of traffic light A at the estimated timing.

In some embodiments, the target operation At step 420 may further include: acquiring a route of the target vehicle and notifying the next traffic light on the route of the vehicle classification and the estimated arrival timing of the target vehicle by means of microwaves, wireless communications, etc., so that the next traffic light can plan ahead (whether to turn green, the timing, the duration, etc.).

It should be understood that the embodiments described above may be implemented independently or in combination.

It should be understood that the target vehicle may be any vehicle or a plurality of vehicles traveling on the first road. When the target vehicle is a plurality of vehicles, data processing device 200 may determine vehicle classifications of the plurality of vehicles, respectively, and may process a request from a vehicle with the maximum vehicle classification.

It should be understood that when data processing device 200 processes the request sent by the target vehicle, the number of the second road(s) may be one, two, or more (marked as sub-second roads). For example, when the first road is a straight lane 131, the second road may include two sub-second roads, namely a left turning lane 132 and a road 140 in an east-west direction. When the number of the second roads is two or more, the data processing device may comprehensively consider the road levels of the two sub-second roads and determine the road level of the second roads. For example, data processing device 200 may take a weighted average value, a maximum value, etc. of the road levels of the two sub-second roads as the road level of the second roads.

The process 400 may further include: determining whether the traffic light should turn red when the target vehicle enters the target area. That is, before receiving the request from the target vehicle, data processing device 200 may determine the status of the traffic light in the target area where the vehicle enters in advance. For example, data processing device 200 may determine a traffic light status in the target area where the vehicle enters in advance based on information such as a vehicle location, a speed, and a destination sent by the target vehicle. When it is determined in advance that the traffic light status passed by the target vehicle is that a green light is turned on, data processing device 200 does not accept the request sent by the vehicle.

Process 400 may further include: when a continuous duration of red light or green light referenced by the target vehicle during traveling in the target area is longer than the second threshold, switching the traffic light to green or red. The second threshold is the duration of a continuous red or green signal. Under some special circumstances, a vehicle on a certain road always has an extremely high or low vehicle classification, the traffic light referenced by the vehicle keeps being green or red, which may disrupt the traffic order. Therefore, when the duration of continuous red or green signal referenced by a vehicle on a certain road (e.g., the first road) is longer than the second threshold, the traffic light switches to green or red. For example, if road 140 is a main road with heavy traffic and road 130 is a small branch road, the traffic volume in the target area L2 is always far greater than that in the target area L1. In order to prevent the road level of road 140 in the target area L2 from being higher than the vehicle classification of the waiting vehicle 120 for a long time, data processing device 200 (receiving apparatus 160) may set the red light duration of traffic lights A and B as the second threshold, such as 2 minutes. Similarly, data processing device 200 (receiving apparatus 160) may also set a green light duration of traffic lights A and B, for example, to be 40 seconds. The second threshold may be determined based on the actual traffic conditions at the intersection or may be manually set based on experiences.

In summary, an aspect of the present disclosure relates to a method for controlling traffic lights and a traffic light system using the method. Specifically, the method may include: acquiring, by a receiving apparatus, a vehicle classification of a target vehicle, and determining whether to turn green for the vehicle arriving at the traffic light based on the vehicle classification. The system automatically performs the method, which, on the one hand, improves the transportation efficiency of traffic flows at an intersection, and on the other hand, gives consideration to the traffic smoothness of the intersection through which special vehicles pass.

After reading the detailed disclosure, those skilled in the art will understand that the foregoing detailed disclosure may be presented by way of example only and may be non-restrictive. Although not explicitly stated here, those skilled in the art can understand that the present disclosure is intended to cover various reasonable changes, improvements, and modifications of the embodiments. Those changes, improvements and modifications are intended to be proposed by the present disclosure and fall within the scope of the exemplary embodiments of the present disclosure.

In addition, certain terms in the present disclosure have been used to describe the embodiments of the present disclosure. For example, "one embodiment," "an embodiment," and/or "some embodiments" mean that particular features, structures or characteristics described in connection with the embodiment(s) may be included in at least one embodiment of the present disclosure. Therefore, it should be emphasized and understood that two or more references to "an embodiment" or "one embodiment" or "an alternative embodiment" in various parts of this specification do not necessarily refer to the same embodiment. In addition, the particular features, structures, or characteristics may be combined appropriately in one or more embodiments of the present disclosure.

It should be understood that in the foregoing description of the embodiments of the present disclosure, in order to help the understanding of one feature and for the purpose of simplification, the present disclosure sometimes combines various features in a single embodiment, drawing or description thereof. Alternatively, the present disclosure sometimes disperses various features in a plurality of embodiments of the present disclosure. However, this does not mean that a combination of these features is necessary, and when reading the present disclosure, it is entirely possible for those skilled in the art to extract some of the features as a separate embodiment for understanding. That is, the embodiments in the present disclosure may also be understood as an integration of a plurality of sub-embodiments. In addition, the content of each sub-embodiment is also tenable when the features thereof are less than those of the single embodiment.

In some embodiments, the numerals expressing the quantities or properties used to describe and claim certain embodiments of the present disclosure should be understood as being modified by the term "about," "approximately" or "substantially" in some cases. For example, unless otherwise stated, "about," "approximately" or "substantially" may mean a change of ±20% of the value described. Therefore, in some embodiments, the numerical parameters listed in the written description and the appended claims are approximate values that may vary depending on the desired properties sought to be obtained by a particular embodiment. In some embodiments, numerical parameters should be interpreted according to the number of significant digits reported and by applying the common rounding techniques. Although some embodiments of the present disclosure have listed a wide range of numerical ranges and the parameters are approximate values, specific embodiments have listed values as accurately as possible.

Each of the patents, patent applications, patent application publications, and other materials cited herein, such as articles, books, specifications, publications, documents, items, etc., may be incorporated herein by reference. All contents for various purposes are associated with this document at present or in the future, except, among the related complaint document histories, any complaint document history that may be inconsistent or conflicted with this document or may have a restrictive influence on the broadest scope of the claims. For example, suppose there is any inconsistency or conflict between the description, definition, and/or use of terms associated with any included material and those of terms related to this document. In that case, the terms in this document should prevail.

Finally, it should be understood that the embodiments disclosed herein are illustrative of the principles of the embodiments of the present disclosure. Other modified embodiments also fall within the scope of the present disclosure. Thus, the embodiments disclosed herein are merely examples rather than limitations. Those skilled in the art can adopt alternative configurations according to the embodiments of the present disclosure to realize the invention in the present disclosure. Therefore, the embodiments of the present disclosure are not limited to those which have been accurately described in the present disclosure.

The invention claimed is:

1. An apparatus for controlling traffic lights, comprising:
at least one storage device storing a set of instructions; and
at least one processor in communication with the at least one storage device, wherein when the set of instructions is executed, the at least one processor is to:
acquire a request for switching a target traffic light to green, wherein the request is transmitted from a target vehicle on a first road;

establish a model comprising a plurality of dimensions, wherein the plurality of dimensions corresponds to a vehicle classification of the target vehicle, a travel purpose of the target vehicle, and a travel time of the target vehicle;

determine the vehicle classification of the target vehicle based on the model;

in response to determining that the vehicle classification of the target vehicle is not lower than a first threshold, perform a target operation; and in response to determining that the vehicle classification of the target vehicle is not lower than a road level of a second road and that the vehicle classification of the target vehicle is lower than the first threshold, instruct the target traffic light to turn green, wherein the road level is determined based on a number of a plurality of vehicles on the second road in a target area and vehicle classifications of the plurality of vehicles on the second road in the target area, wherein a color of a traffic light referenced by the target vehicle when travelling in the target area is different from a color of a traffic light referenced by a vehicle travelling on the second road, and wherein the first road and the second road are intersecting roads or different lanes of a same road.

2. The apparatus according to claim 1, wherein, to perform the target operation, the at least one processor is to:
determine that the target traffic light corresponding to the target vehicle turns red when the target vehicle enters the target area, wherein the target area comprises an area within a predetermined proximity to the target traffic light.

3. The apparatus according to claim 1, wherein, to perform the target operation, the at least one processor is to:
instruct the target traffic light to turn green.

4. The apparatus according to claim 1, wherein, to perform the target operation, the at least one processor is to:
determine that the vehicle classification of the target vehicle is not lower than a maximum value of vehicle classifications of all vehicles on the second road in the target area; and
instruct the target traffic light to turn green.

5. The apparatus according to claim 1, wherein the target operation comprises:
guiding a speed of the target vehicle; and
sending vehicle information of the target vehicle to at least one next receiving apparatus in a route of the target vehicle.

6. The apparatus according to claim 1, wherein, to determine that the vehicle classification of the target vehicle is not lower than the road level of the second road, the at least one processor is to:
determine that the vehicle classification of the target vehicle is not lower than a maximum value of the vehicle classifications of all the vehicles on the second road in the target area; and
determine that the vehicle classification of the target vehicle is not lower than the road level of the second road.

7. The apparatus according to claim 6, wherein the road level of the second road in the target area increases as the number of vehicles on the second road increases, and wherein the road level of the second road in the target area increases as the vehicle classification on the second road increases.

8. The apparatus according to claim 1, wherein the at least one processor is further to:

receive a second request sent by the target vehicle when the vehicle classification of the target vehicle changes.

9. The apparatus according to claim 1, wherein the at least one processor further:
changes a color of the traffic light referenced by the target vehicle when travelling in the target area, in response to determining that a continuous duration of a red light or a green light referenced by the target vehicle when travelling in the target area is greater than a second threshold.

10. A method for controlling traffic lights, comprising:
acquiring, by a receiving apparatus, a request for switching a target traffic light to green, wherein the request is transmitted from a target vehicle on a first road;
constructing, by the receiving apparatus, a model comprising a plurality of dimensions, wherein the plurality of dimensions corresponds to a vehicle classification, a travel purpose, and a travel time of the target vehicle;
determining, by the receiving apparatus, the vehicle classification of the target vehicle based on the model;
in response to determining that vehicle classification of the target vehicle is not lower than a first threshold, performing, by the receiving apparatus, a target operation; and
in response to determining that the vehicle classification of the target vehicle is not lower than a road level of a second road and that the vehicle classification of the target vehicle is lower than the first threshold instructing, by the receiving apparatus, the target traffic light to turn green, wherein the road level is determined based on a number of a plurality of vehicles on the second road in a target area and a vehicle classification of the plurality of vehicles on the second road in the target area, wherein a color of the traffic light referenced by the target vehicle when travelling in the target area is different from a color of a traffic light referenced by a vehicle when travelling on the second road, and wherein the first road and the second road are intersecting roads or different lanes of a same road.

11. The method according to claim 10, wherein the target operation comprises:
determining that the target traffic light corresponding to the target vehicle turns red, when the target vehicle enters the target area, wherein the target area comprises an area within a predetermined proximity to the target traffic light.

12. The method according to claim 10, wherein the target operation comprises:
instructing the target traffic light to turn green.

13. The method according to claim 10, wherein the target operation comprises:
determining that the vehicle classification of the target vehicle is not lower than a maximum value of vehicle classifications of all transports on the second road in the target area; and
instructing the target traffic light to turn green.

14. The method according to claim 10, wherein the target operation comprises:
guiding a speed of the target vehicle; and
sending vehicle information of the target vehicle to at least one next receiving apparatus in a route of the target vehicle.

15. The method according to claim 10, wherein determining that the vehicle classification of the target vehicle is not lower than the road level of the second road comprises:
determining that the vehicle classification of the target vehicle is not lower than a maximum value of the vehicle classifications of all the vehicles on the second road in the target area; and determining that the vehicle classifications of the target vehicle is not lower than the road level of the second road.

16. The method according to claim 15, wherein the road level of the second road in the target area increases as the number of vehicles on the second road increases, and wherein the road level of the second road in the target area increases as the vehicle classifications on such road increase.

17. The method according to claim 10, further comprising:

receiving a second request sent by the target vehicle when the vehicle classification of the target vehicle changes.

18. The method according to claim 10, further comprising:

changing, by the receiving apparatus, a color of the traffic light referenced by the target vehicle when travelling in the target area, in response to determining that a continuous duration of a red light or a green light referenced by the target vehicle when travelling in the target area is greater than a second threshold.

* * * * *